United States Patent
Shenai et al.

(10) Patent No.: US 6,819,088 B2
(45) Date of Patent: Nov. 16, 2004

(54) DC-DC CONVERTER WITH RESONANT GATE DRIVE

(76) Inventors: Krishna Shenai, 2259 Palmer Cir., Naperville, IL (US) 60564; Malay Trivedi, 2507 W. Geneva Dr., Tempe, AZ (US) 85282

(*) Notice: Subject to any disclaimer, the term of this patent is extended or adjusted under 35 U.S.C. 154(b) by 0 days.

(21) Appl. No.: 10/288,044

(22) Filed: Nov. 5, 2002

(65) Prior Publication Data

US 2003/0090918 A1 May 15, 2003

Related U.S. Application Data (60) Provisional application No. 60/337,837, filed on Nov. 5, 2001.

(51) Int. Cl.$^7$ .............................................. G05F 1/656
(52) U.S. Cl. ...................... 323/222; 323/224; 323/282
(58) Field of Search ................................. 323/222, 223, 323/224, 259, 282, 284, 289, 290; 327/423, 424, 588

(56) References Cited

U.S. PATENT DOCUMENTS

| | | | |
|---|---|---|---|
| 4,535,399 A | * 8/1985 | Szepesi | 363/41 |
| 4,626,715 A | 12/1986 | Ishii | 307/585 |
| 4,664,247 A | 2/1987 | Burmenko et al. | 320/39 |
| 4,758,937 A | 7/1988 | Usui et al. | 363/19 |
| 4,806,842 A | 2/1989 | Bittner | 323/222 |
| 4,819,180 A | 4/1989 | Hedman et al. | 364/492 |
| 4,922,396 A | 5/1990 | Niggemeyer | 363/21 |
| 4,967,109 A | 10/1990 | Steigerwald | 307/571 |
| 5,088,017 A | 2/1992 | Yaginuma et al. | 363/21 |
| 5,142,684 A | 8/1992 | Perry et al. | 395/750 |
| 5,153,535 A | 10/1992 | Fairbanks et al. | 331/143 |
| 5,167,024 A | 11/1992 | Smith et al. | 395/375 |
| 5,245,524 A | 9/1993 | Nakagawa et al. | 363/62 |
| 5,272,614 A | 12/1993 | Brunk et al. | 363/21 |

(List continued on next page.)

FOREIGN PATENT DOCUMENTS

| | | |
|---|---|---|
| EP | 0 568 279 A1 | 11/1993 |
| EP | 1 146 629 A2 | 10/2001 |

OTHER PUBLICATIONS

The Bradley Dept. of Electrical and Computer Engineering, Chen, Y., Lee, F.C., Amoroso, L., Wu, H., "A Resonant MOSFET Gate Driver with Complete Energy Recovery," Center for Power Electronics Systems (CPES).

NASA's Jet Propulsion Laboratory, Pasadena, CA, Rippel, W.E., "Recovering Energy From a Rapidly Switched Gate," 2301 NTIS Tech Notes, Dec. 1990.

IEEE, Wiegman, H.L.N., "A Resonant Pulse Gate Drive for High Frequency Applications," General Electric, Corporate Research & Development, (IEEE 0-7803-0485-3/92), 1992.

International Search Report for PCT/US 02/35413, Mar. 4, 2003.

*Primary Examiner*—Michael Sherry
*Assistant Examiner*—Gary L. Laxton
(74) *Attorney, Agent, or Firm*—McDonnell, Boehnen, Hulbert & Berghoff LLP (57) ABSTRACT

A direct current to direct current boost or buck voltage converter in accordance with the invention includes a plurality of switching devices that effect voltage conversion and control current flow direction in the converter. The converter also includes a control circuit for comparing an output voltage of the converter with a reference voltage, where the control circuit produces a comparison signal based on that comparison. A resonant gate-drive circuit, also included in the converter and coupled with the control circuit and the plurality of switching devices, opens and closes the plurality of switches in response to the comparison signal to effect voltage conversion and control current flow direction.

13 Claims, 10 Drawing Sheets

U.S. PATENT DOCUMENTS

| | | | |
|---|---|---|---|
| 5,355,301 A | 10/1994 | Saito et al. | 363/147 |
| 5,396,635 A | 3/1995 | Fung | 395/800 |
| 5,404,543 A | 4/1995 | Faucher et al. | 395/750 |
| 5,455,501 A | 10/1995 | Massie | 323/267 |
| 5,469,399 A | 11/1995 | Sato et al. | 365/226 |
| 5,481,446 A | 1/1996 | Timmins | 363/41 |
| 5,483,182 A | 1/1996 | Rybicki | 327/5 |
| 5,485,127 A | 1/1996 | Bertoluzzi et al. | 331/69 |
| 5,489,837 A | 2/1996 | Arakawa | 323/207 |
| 5,490,053 A | 2/1996 | Tkacenko et al. | 363/15 |
| 5,502,610 A | 3/1996 | Chaney | 361/18 |
| 5,502,629 A | 3/1996 | Ito et al. | 363/60 |
| 5,528,538 A | 6/1996 | Sakuta et al. | 365/189.09 |
| 5,534,771 A | 7/1996 | Massie | 323/285 |
| 5,537,021 A | 7/1996 | Weinberg et al. | 320/1 |
| 5,548,763 A | 8/1996 | Combs et al. | 395/750 |
| 5,568,044 A | 10/1996 | Bittner | 323/272 |
| 5,586,308 A | 12/1996 | Hawkins et al. | 395/556 |
| 5,586,332 A | 12/1996 | Jain et al. | 395/750 |
| 5,598,092 A | 1/1997 | Ohtsuka et al. | 323/222 |
| 5,628,020 A | 5/1997 | O'Brien | 395/750 |
| 5,630,143 A | 5/1997 | Maher et al. | 395/750 |
| 5,630,148 A | 5/1997 | Norris | 395/750 |
| 5,632,037 A | 5/1997 | Maher et al. | 395/750 |
| 5,635,872 A | 6/1997 | Zimmerman | 330/128 |
| 5,646,572 A | 7/1997 | Masleid | 327/545 |
| 5,696,953 A | 12/1997 | Wong et al. | 395/560 |
| 5,723,974 A * | 3/1998 | Gray | 323/282 |
| 5,724,249 A | 3/1998 | Kodali et al. | 364/488 |
| 5,727,193 A | 3/1998 | Takeuchi | 395/556 |
| 5,729,720 A | 3/1998 | Kau et al. | 395/555 |
| 5,745,375 A | 4/1998 | Reinhardt et al. | 364/492 |
| 5,757,635 A | 5/1998 | Seong | 363/89 |
| 5,768,602 A | 6/1998 | Dhuey | 395/750.04 |
| 5,771,373 A | 6/1998 | Kau et al. | 395/555 |
| 5,774,734 A | 6/1998 | Kikinis et al. | 395/750.01 |
| 5,778,237 A | 7/1998 | Yamamoto et al. | 395/750.04 |
| 5,781,784 A | 7/1998 | McKinley | 395/750.03 |
| 5,787,294 A | 7/1998 | Evoy | 395/750.03 |
| 5,812,860 A | 9/1998 | Horden et al. | 395/750.04 |
| 5,845,138 A | 12/1998 | Nowlin, Jr. | 395/750.05 |
| 5,847,951 A * | 12/1998 | Brown et al. | 363/147 |
| 5,869,970 A | 2/1999 | Palm et al. | 324/433 |
| 5,894,579 A | 4/1999 | Fujihara | 395/750.06 |
| 5,905,901 A | 5/1999 | Klein | 395/750.06 |
| 5,909,145 A | 6/1999 | Zimmerman | 330/128 |
| 5,910,930 A | 6/1999 | Dieffenderfer | 368/156 |
| 5,913,067 A | 6/1999 | Klein | 395/750.01 |
| 5,919,262 A | 7/1999 | Kikinis et al. | 713/300 |
| 5,945,817 A | 8/1999 | Nguyen | 323/273 |
| 5,954,820 A | 9/1999 | Hetzler | 713/323 |
| 5,958,058 A | 9/1999 | Barrus | 713/320 |
| 5,959,439 A | 9/1999 | Shenai et al. | 323/222 |
| 5,974,556 A | 10/1999 | Jackson et al. | 713/322 |
| 5,974,557 A | 10/1999 | Thomas et al. | 713/322 |
| 5,978,923 A | 11/1999 | Kou | 713/323 |
| 5,983,357 A | 11/1999 | Sun | 713/324 |
| 5,987,244 A | 11/1999 | Kau et al. | 395/555 |
| 5,987,614 A | 11/1999 | Mitchell et al. | 713/300 |
| 5,996,084 A | 11/1999 | Watts | 713/323 |
| 6,000,035 A | 12/1999 | Matsushima et al. | 713/320 |
| 6,016,071 A | 1/2000 | Shay | 327/294 |
| 6,049,472 A | 4/2000 | Suzuki et al. | 363/37 |
| 6,065,122 A | 5/2000 | Wunderlich et al. | 713/320 |
| 6,065,124 A | 5/2000 | Lee | 713/323 |
| 6,094,367 A | 7/2000 | Hsu et al. | 363/78 |
| 6,105,139 A | 8/2000 | Dey et al. | 713/300 |
| 6,105,142 A | 8/2000 | Goff et al. | 713/324 |
| 6,115,823 A | 9/2000 | Velasco et al. | 713/322 |
| 6,118,248 A | 9/2000 | Gartstein et al. | 320/107 |
| 6,127,815 A | 10/2000 | Wilcox | 323/282 |
| 6,128,745 A | 10/2000 | Anderson et al. | 713/323 |
| 6,141,762 A | 10/2000 | Nicol et al. | 713/300 |
| 6,151,681 A | 11/2000 | Roden et al. | 713/322 |
| 6,158,012 A | 12/2000 | Watts, Jr. | 713/322 |
| 6,163,086 A | 12/2000 | Choo | 307/43 |
| 6,163,131 A | 12/2000 | Gartstein et al. | 320/118 |
| 6,163,845 A | 12/2000 | Zhao et al. | 713/300 |
| 6,166,562 A | 12/2000 | Mita et al. | 326/83 |
| 6,167,330 A | 12/2000 | Linderman | 700/295 |
| 6,169,683 B1 | 1/2001 | Farrington | 363/127 |
| 6,182,232 B1 | 1/2001 | Klein | 713/340 |
| 6,184,660 B1 | 2/2001 | Hatular | 320/141 |
| 6,185,460 B1 | 2/2001 | Thompson | 607/16 |
| 6,192,479 B1 | 2/2001 | Ko | 713/300 |
| 6,195,755 B1 | 2/2001 | Webster et al. | 713/330 |
| 6,198,250 B1 | 3/2001 | Gartstein et al. | 320/112 |
| 6,204,649 B1 | 3/2001 | Roman | 323/282 |
| 6,212,645 B1 | 4/2001 | Tjandrasuwita | 713/330 |
| 6,246,184 B1 | 6/2001 | Salerno | 315/291 |
| 6,246,592 B1 | 6/2001 | Balogh et al. | 363/16 |
| 6,260,149 B1 | 7/2001 | Baweja | 713/300 |
| 6,260,151 B1 | 7/2001 | Omizo et al. | 713/324 |
| 6,262,564 B1 * | 7/2001 | Kanamori | 323/224 |
| 6,262,901 B1 | 7/2001 | Simopoulos | 363/72 |
| 6,271,712 B1 | 8/2001 | Ball | 327/531 |
| 6,275,401 B1 | 8/2001 | Xia | 363/127 |
| 6,282,661 B1 | 8/2001 | Nicol | 713/300 |
| 6,304,066 B1 * | 10/2001 | Wilcox et al. | 323/282 |
| 6,324,426 B1 | 11/2001 | Thompson | 607/16 |
| 6,345,362 B1 | 2/2002 | Bertin et al. | 713/300 |
| 6,347,379 B1 | 2/2002 | Dai et al. | 713/320 |
| 6,366,066 B1 | 4/2002 | Wilcox | 323/282 |
| 6,366,506 B1 | 4/2002 | Mizuno et al. | 365/189.09 |
| 2002/0011885 A1 | 1/2002 | Ogawa et al. | 327/158 |

* cited by examiner

FIGURE 10

DC-DC CONVERTER WITH RESONANT GATE DRIVE

PRIORITY AND RELATED APPLICATIONS

The present patent application claims priority under 35 U.S.C. §119(e) to U.S. Provisional Patent Application Ser. No. 60/337,837 entitled "Novel DC-DC Step-Down Converter with Resonant Gate Drive"; filed on Nov. 5, 2001, the full disclosure of which is incorporated herein by reference.

The following references to non-provisional patent applications are also incorporated by reference herein:

"Monolithic Battery Charging Device" to Shenai et al., Ser. No. 10/288,177, filed concurrently herewith;

"DC—DC Converter with Current Control" to Shenai et al., Ser. No. 10/289,115, filed concurrently herewith; and "Synchronous Switched Boost and Buck Converter" to Shenai et al., Ser. No. 10/288,987, filed concurrently herewith.

FIELD OF INVENTION

The present invention relates to power converters and, more specifically, to direct current to direct current step-down voltage converters (buck converters), and to direct current to direct current step-up voltage converters (boost converters).

BACKGROUND

Direct-current to direct current voltage converters (DC—DC converters) are used frequently in electrical and electronic systems to convert one voltage potential to another voltage potential. Such DC—DC converters typically have some form of regulation that controls an output voltage for the DC—DC converter as the electrical power consumed by an electrical load connected with the DC—DC converter changes. Such loads may include microprocessors, wireless communication devices, or any other electronic system or component that uses a DC voltage. One common type of DC—DC converter may be referred to as a buck converter. Buck converters step down an input voltage to provide a lower voltage potential output voltage. Another common type of DC—DC converter may be referred to as a boost converter. Boost converters step up an input voltage to provide a higher voltage potential output voltage.

One challenge that is faced when designing DC—DC converters, such as buck and boost converters, is the efficiency of such converters. Efficiency may be measured by the ratio of output power to input power. Therefore, efficiency for a given DC—DC converter indicates the amount of power consumed, or lost, as a result of the conversion from the input voltage potential to the output voltage potential. Current approaches for implementing DC—DC buck converters may have efficiencies on the order of 50% percent. As electrical and electronic systems continue to increase in complexity, such power losses due to voltage conversion may present more significant design challenges. Therefore, alternative approaches for buck converters may be desirable.

SUMMARY

A direct current to direct current boost or buck voltage converter in accordance with the invention includes a plurality of switching devices that effect voltage conversion and control current flow direction in the converter. The converter also includes a control circuit for comparing an output voltage of the converter with a reference voltage, where the control circuit produces a comparison signal based on that comparison. A resonant gate-drive circuit, also included in the converter and coupled with the control circuit and the plurality of switching devices, opens and closes the plurality of switches in response to the comparison signal to effect voltage conversion and control current flow direction.

BRIEF DESCRIPTION OF THE DRAWINGS

The subject matter regarded as the invention is particularly pointed out and distinctly claimed in the concluding portion of the specification. The invention, however, as to both organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

As was previously indicated, current approaches for implementing a buck or boost converter may have efficiencies in the range of 50% percent. Such efficiencies may create significant design challenges in certain applications, such as, for example, monolithic direct current to direct-current step-down voltage converters (buck converters) or step-up voltage converters (boost converters) integrated on a semiconductor device with other circuitry. Such challenges may include power consumption, circuit element sizes for such DC—DC converters, among other issues.

Figure 1:
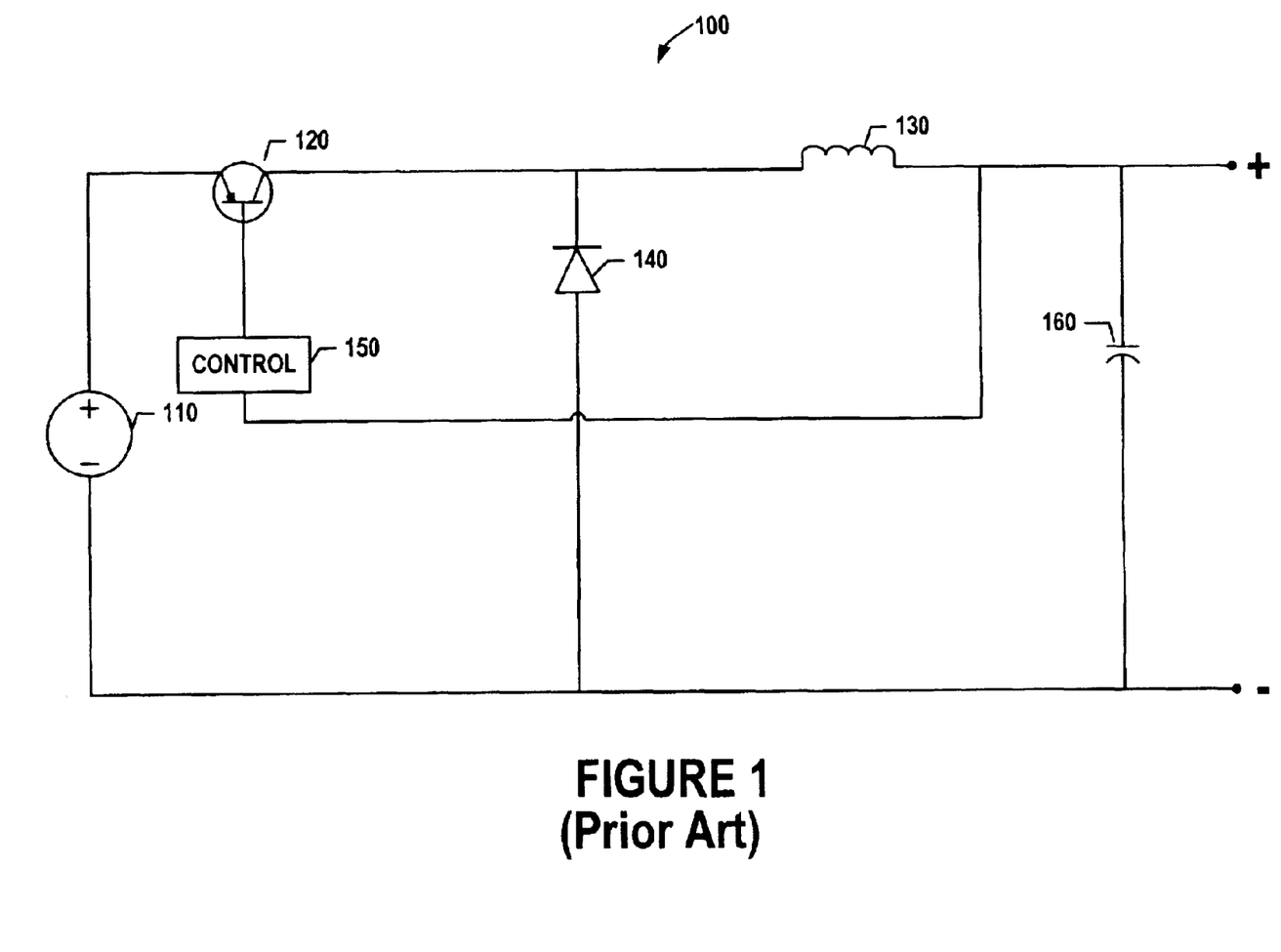
FIG. 1 is a schematic diagram illustrating a prior art direct current to direct current voltage step-down converter (buck converter)

FIG. 1 is a schematic diagram illustrating such a prior-art buck converter 100. Buck converter 100 comprises a direct current voltage supply 110. Supply 110 is coupled with a switch 120, which takes the form of a bipolar transistor for this embodiment. Buck converter 100 also includes inductor 130, diode 140, control circuit 150 and capacitor 160. Such a configuration is well-known and will not be discussed in detail here. Briefly, however, control circuit 150 typically includes a startup oscillator and either a pulse-width modulated (PWM) circuit or a pulse-frequency-modulated (PFM) circuit. In such configurations, the PWM or PFM circuit is coupled directly with switch 120. Such a configuration typically results in power loss due the power consumed to turn switch 120 on and off during operation of buck converter 120. These switching losses adversely impact the efficiency of buck converter 100 and similar converter topologies. Therefore, alternative techniques for implementing a buck (or boost) converter may be desirable.

Various exemplary embodiments of the invention will now be described. Some of these embodiments include analogous elements that are referenced with like reference numbers. It will be appreciated, however, that the invention is not limited in scope in this respect, as many alternatives for such elements may exist. Also, specific implementations of such buck and boost converters may vary. For example, converters in accordance with the invention may be implemented using discrete components or, alternatively, may be implement monolithically on a single integrated circuit device.

Figure 2:
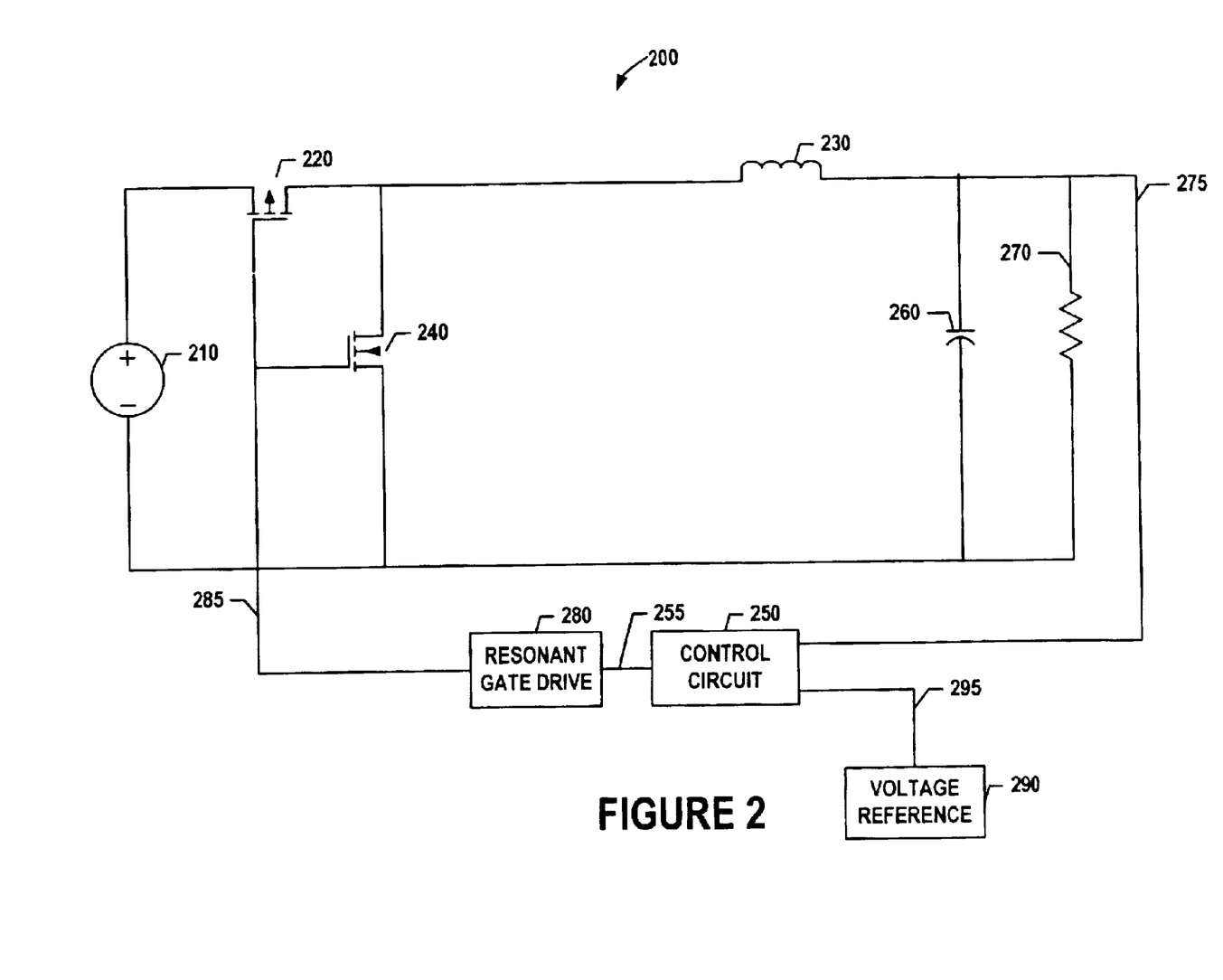
FIG. 2 is a schematic drawing illustrating an embodiment of a buck converter with resonant gate drive in accordance with the invention.

FIG. 2 illustrates an embodiment of a buck converter 200 in accordance with the invention that may, at least in part, overcome some of the issues discussed with respect to current boost and buck converter configurations. Buck converter 200 includes a substantially static direct current (DC) voltage power supply 210. Power supply 210 is coupled with a series synchronous rectifier that includes a p-type field effect transistor (FET) 220 and an n-type FET 240. Buck converter 200 further includes an inductive-capacitive output voltage filter that includes inductor 230 and capacitor 260. Buck converter 200 may supply voltage to a load resistance 270. It will be appreciated that load resistance 270 typically is a time varying load impedance. In this regard, buck converter 200 is typically regulated based, at least in part, on the power consumed by load resistance 270.

Buck converter 200 also includes a voltage reference source 290, which may generate a reference voltage (e.g. a desired output voltage) for buck converter 200. The reference voltage produced by voltage reference 290 may compared with an output voltage of buck converter 200 by control circuit 250. In this regard, the reference voltage may be communicated to control circuit 250 via a signal line 295 while the output voltage of buck converter 200 may be communicated to control circuit 250 via a signal line 275. Control circuit 250 then generates a signal based on that comparison. Such voltage comparison is discussed in further detail hereinafter with respect to FIG. 3.

The signal generated by control circuit 250 may be communicated, via a signal line 255, to a resonant gate-drive circuit 280. Resonant gate-drive circuit 280 may, in response to this signal, operate, via signal line 285, p-type FET 220 and n-type FET 240 (the series synchronous rectifier) so as to regulate the output voltage of buck converter 200 so that it approximates the reference voltage generated by reference voltage source 290. Such a configuration may be advantageous as the resonant gate-drive circuit 280 may reduce power losses that result from switching without such drive circuits, such as in previous buck converter configurations. Each of the components of buck converter 200 will now be described in further detail.

Figure 3:
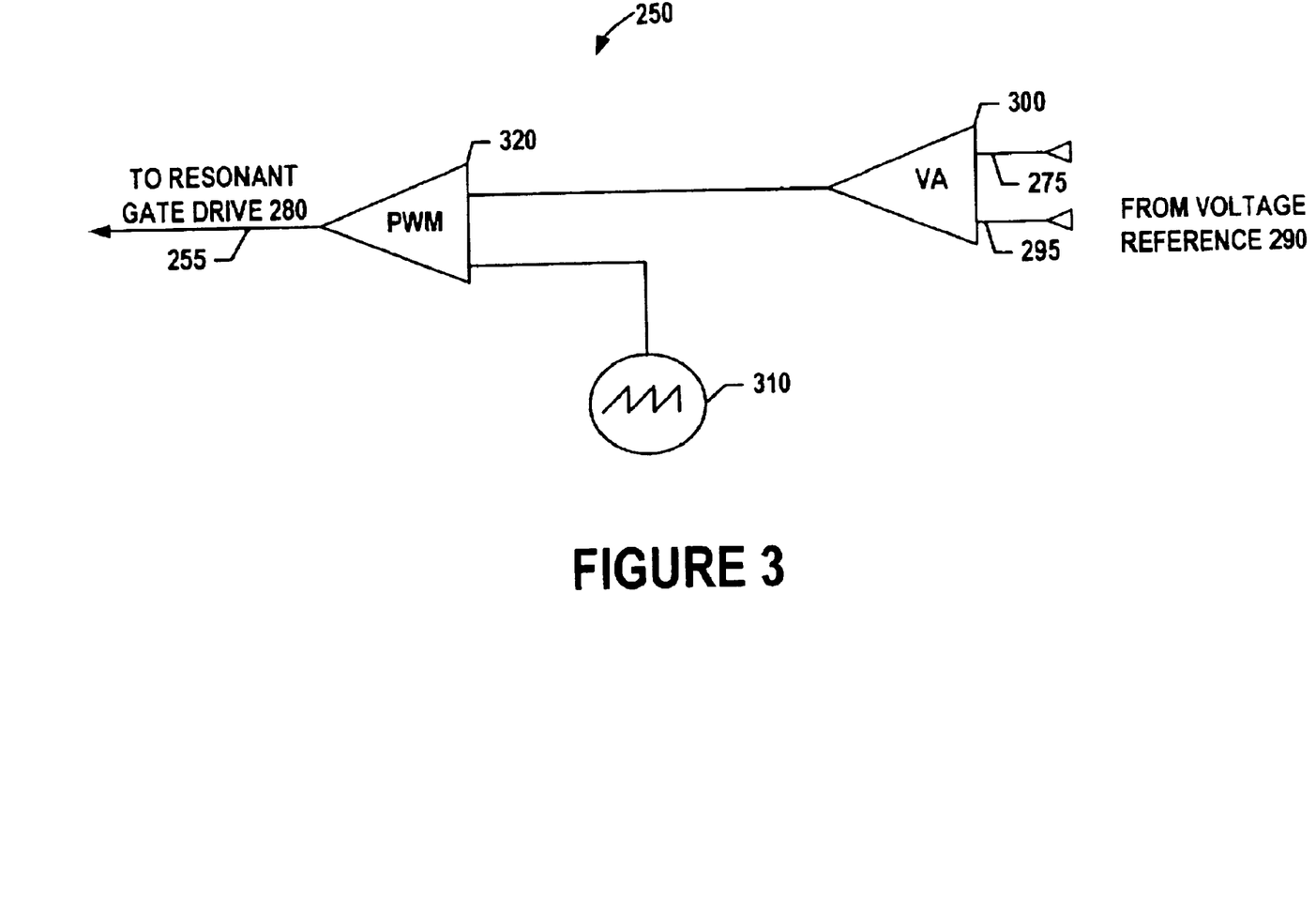
FIG. 3 is a schematic diagram illustrating an embodiment of a control circuit that may be used in the buck converter illustrated in FIG. 2.

FIG. 3 is a schematic diagram illustrating an embodiment of control circuit 250 in accordance with the invention that may be used in buck converter 200, as shown in FIG. 2. Control circuit 250 includes a voltage amplifier 300. The input terminals of voltage amplifier 300 are coupled with signal lines 275 and 295, respectively the output voltage of buck converter 200 and the reference voltage produced by voltage reference source 290. Voltage amplifier 300, in operation, compares these voltages and produces a signal that indicates whether the output voltage of buck converter 200 is above or below the reference voltage, where the reference voltage is typically the desired operating voltage of buck converter 200.

This indication signal is then communicated to a PWM circuit 320 where it is compared with a pulse train (typically a series of triangular pulses or voltage ramps) that is produced by a signal source 310. PWM circuit 320 may then produce the comparison signal that is used by resonant gate-drive circuit 280 to regulate the output voltage of buck converter 200 using the series synchronous rectifier.

Figure 4:
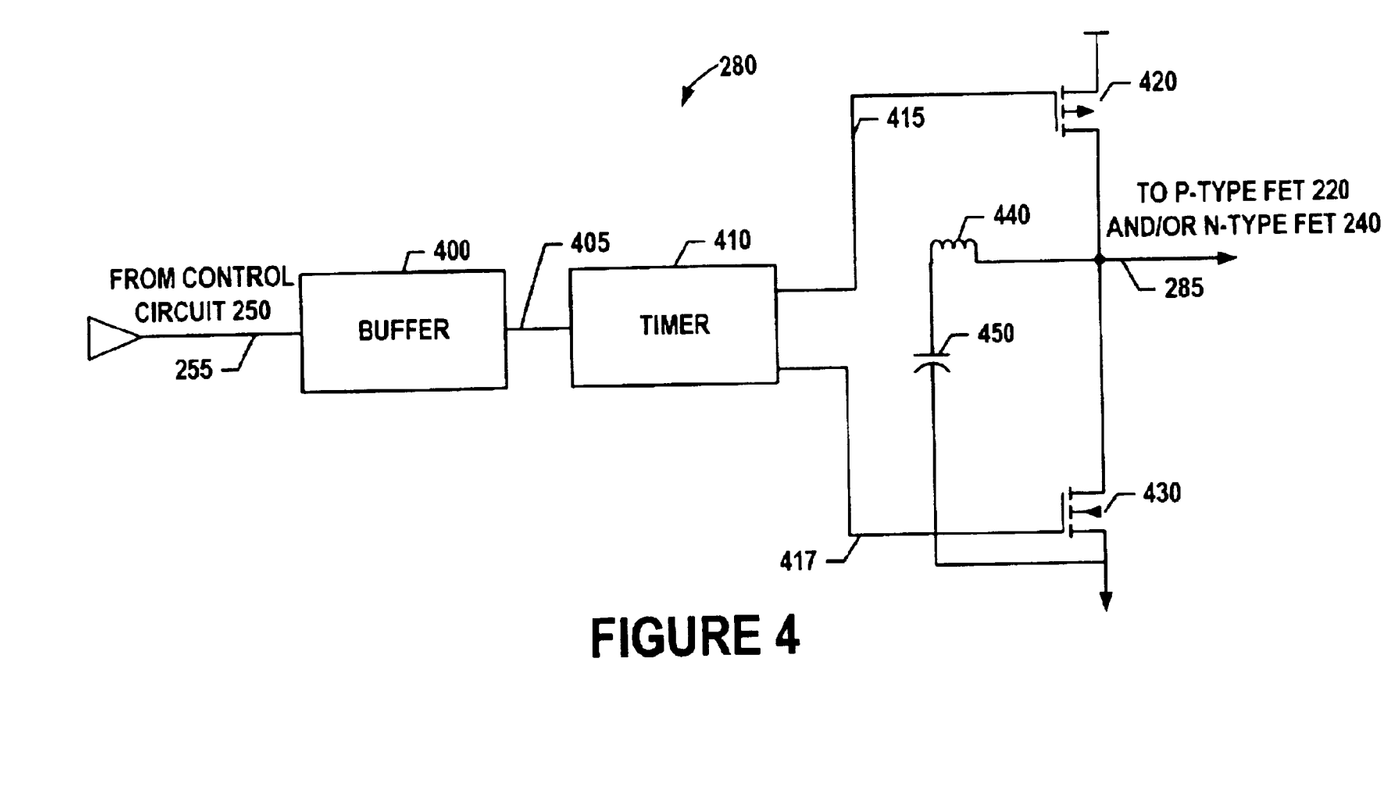
FIG. 4 is a schematic diagram illustrating an embodiment of a resonant gate-drive circuit in accordance a preferred embodiment.

FIG. 4 is a schematic diagram illustrating an embodiment of resonant gate-drive circuit 280 that may be used in buck converter 200, as shown in FIG. 2. Resonant gate-drive circuit 280, for this embodiment, includes a buffer 400 and a timer 410 coupled with buffer 400. Timer 410 is further coupled, via signal lines 415 and 417, with an inverter circuit that includes p-type FET 420 and n-type FET 430. An inductive-capacitive resonant circuit is coupled between electrical ground and an output terminal of the inverter circuit (signal line 285), as is shown in FIG. 4. The inductive-capacitive circuit includes inductor 440 and capacitor 450. The output terminal of the inverter circuit (and the inductive-capacitive resonant circuit) is coupled with the gates of p-type FET 420 and n-type FET 430 of the series synchronous rectifier.

Timer circuit 410 operates, based on signals communicated from control circuit 250 (via buffer 400), such that p-type FET 420 and n-type FET 430 have overlapping "off" times without a corresponding overlap in "on" times. The overlap in "off" times is desirable as it allows for electrical energy to be transferred between inductor 440 and capacitor 450, and the gates of p-type FET 220 and n-type FET 240. Such a configuration may also reduce losses due to switching because electrical energy for charging the gate capacitance (or electrical energy discharged from the gates) of these FETs is stored using resonant gate-drive circuit 280, as opposed to being supplied from (or communicated to) a power supply rail via a control circuit, such as is shown in FIG. 1.

Resonant gate-drive circuit 280 operates by providing a gate current sink or source by building a drive current in the inductor 440. Specifically, when capacitor 450 is fully charged, and FET 430 is in a conductive state (the signal on line 417 is high), capacitor 450 discharges through inductor 440 and FET 430 to ground (or a reference voltage). When FET 430 is turned off (and before FET 420 is turned on), the current through inductor 440 is provided at node 285 and is used to provide gate current to FETs 220 and 240, thereby turning on n-type FET 240, and turning off p-type FET 220. Timer circuit 410 then provides a logic low on line 415, thereby turning on p-type FET 420, which provides a current path for the inductor current from inductor 440 through p-type FET 420 to the positive supply. Eventually capacitor 450 discharges and the inductor current decreases, and then builds in the opposite direction. Current begins flowing from the positive supply through p-type FET 420, through the inductor 440, and into capacitor 450, thereby recharging capacitor 450. At the appropriate time, timer circuit 410 turns off p-type FET 420, so that both FETs 420 and 430 are not conducting. At this instant, the inductor current is near its negative peak, and as an inductor's current must be continuous in time, it begins drawing current from the gates of FETs 220 and 240 through node 285, thereby turning off n-type FET 240, and turning on p-type FET 220. In this manner, the inductor 440 of the gate drive circuit is used as a current source or sink to provide a gate drive current. By exchanging energy between the capacitor 450 and inductor 440 in a resonant fashion, the switching losses associated with charging and discharging the converter's synchronous FET switches (220 and 240) is reduced. That is, by sequentially increasing the inductor current to a positive value (current provided from the inductor to the gates of the FET devices 420 and 430), and then momentarily diverting sourcing the inductor current to the FET gates, followed by decreasing the inductor current to a negative value and then momentarily sinking the inductor current from the FET gates, the FET gates may be charged and then discharged, respectively.

Figure 5:
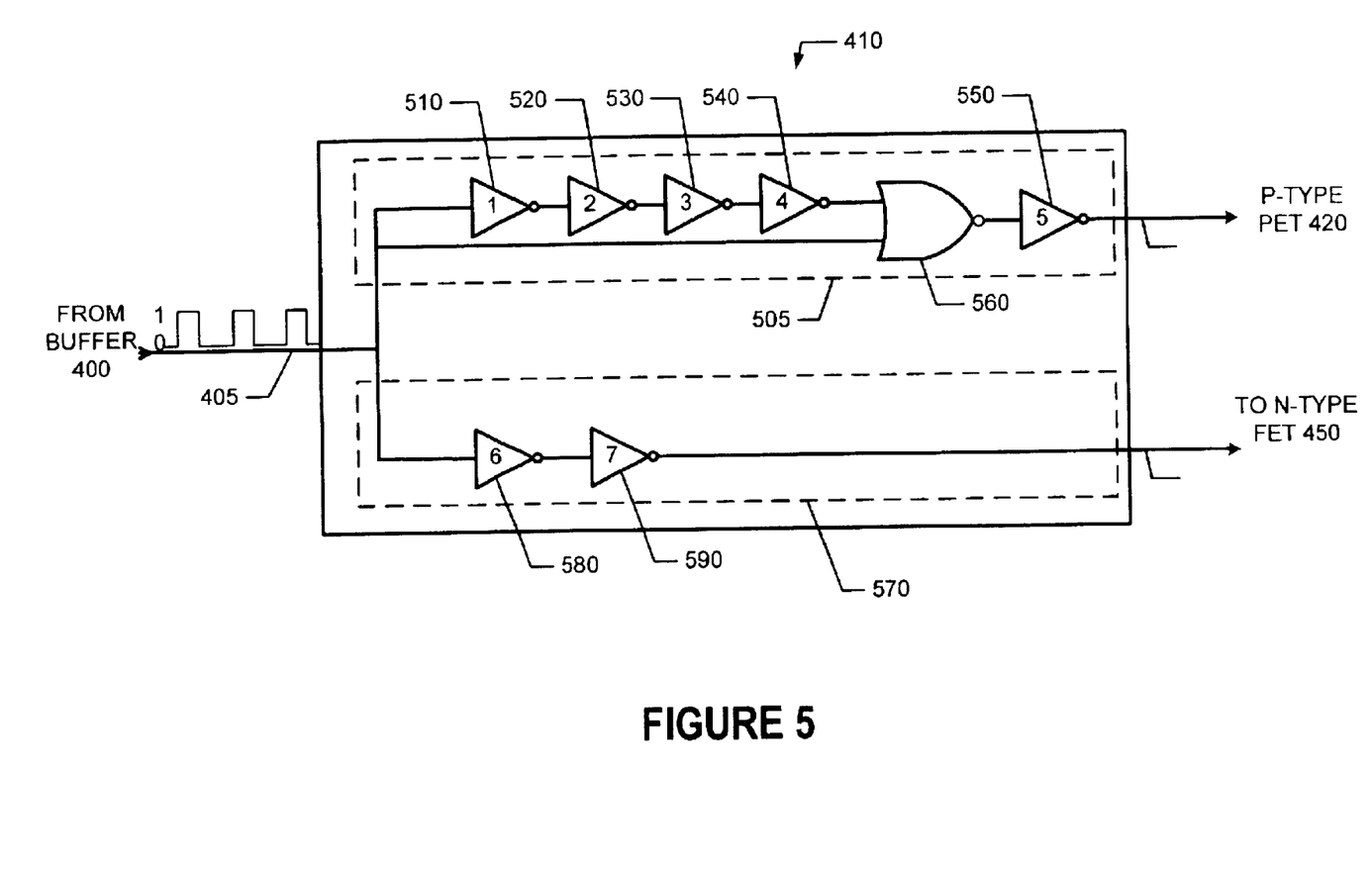
FIG. 5 is a schematic diagram of a timer circuit that may be included in the resonant gate-drive circuit depicted in FIG. 4.

FIG. 5 is a schematic diagram illustrating an embodiment of timer circuit 410 that may be used in resonant gate-drive circuit 280, as is shown in FIG. 4. As was indicated above, timer circuit 410 may operate so as to effect overlapping "off" times for p-type FET 420 and n-type FET 430 so as to provide inductor 440 to operate as a current source or sink for the gates of FETs 420 and 430. In this regard, timer circuit 410 operates such that the FETs are both in a non-conduction state ("off") for a brief period of time.

In this respect, timer 410 includes multiple circuit paths, 505 and 570, that each includes delay elements. Single delay elements may be used or, as in FIG. 5, multiple delay elements may be used in each path. Such a configuration results in a signal that is communicated to an input terminal of the timer (from buffer 400 on signal line 405) reaching the end of each of the multiple circuit paths (505 and 570) at different times. Also, circuit path 505 has a first delay time for a low state to high state transition and a second delay time for a high state to low state transition, where the second delay is longer than the first delay. While the specific operation of timer 410 is now described, it will be appreciated that many alternative timers may be used and the invention is not limited in scope to the use of this, or any particular timer circuit.

In operation, timer 410 receives a signal on signal line 405 from buffer 400. This signal is then communicated to both signal paths 505 and 570. Due to propagation delay for each of the inverters and the NOR gate included in timer 410, the signal received on signal line 405 results in p-type FET 420 and n-type FET 430 being controlled in the fashion described above with respect to "on" and "off" times.

In this regard, looking first at a transition from a low state to a high state on signal line 405, a NOR gate 560 of circuit path 505 produces (or transitions from a high state to) a low state, regardless of the initial state of its other input. This low state is communicated to a fifth inverter 550, which then inverts it to a high state. The high state is then communicated to p-type FET 420, turning it off.

The transition from low state to high state of the signal on line 405 is also communicated to a second circuit path 570. Circuit path 570 includes a sixth inverter 580 that inverts the high state to produce a low state. This low state is communicated to a seventh inverter 590, which inverts its incoming signal to produce a high state. The high state is then communicated to n-type FET 450, which switches it to its ON state.

Like NOR gate 560 and fifth inverter 550, sixth 580 and seventh inverter 590 are in series. As such, the high state that is fed to n-type FET 450 lags behind the high state of the signal communicated from buffer 400 on signal line 405 by the combined propagation delay of sixth inverter 580 and seventh inverter 590, which may have the same duration or different duration.

The individual propagation delays of sixth inverter 580 and seventh inverter 590 may, respectively, have the same duration as NOR gate 560 and fifth inverter 550. Assuming no propagation delay difference for the pinch-off of p-type FET 420 and n-type FET 430, preferably and in practice, the combined propagation delay of sixth inverter 580 and seventh inverter 590 would be longer than the combined propagation delay of the NOR gate 560 and the fifth inverter 550. This situation ensures that when n-type FET 430 switches to its on state, p-type FET 420 is already in its off state.

Looking now at a transition from high state to low state of a signal communicated to timer 410 from buffer 400, the signal is communicated to circuit path 570 and sixth inverter 580 inverts the low state to produce a high state. This high state is communicated to seventh inverter 590, which inverts its incoming signal to produce a low state. The low state is then communicated to n-type FET 430, which switches off.

For at least the combined propagation delay of a first, second, third and fourth inverter (510, 520, 530 and 540) the output of circuit path 505 remains unchanged after receiving the high-to-low state signal transition. Although the low state is communicated directly to the first input of NOR gate 560, the output of NOR gate 560 continues to provide a low state until fourth inverter 540 provides a low state signal. This period of time is at least the combined propagation delay of first, second, third and fourth inverters 510, 520, 530, 540.

When the fourth inverter provides the low state to the second input of NOR gate 560, the output of NOR gate 560 produces a high state signal that is fed to fifth inverter 570. Fifth inverter 570 then supplies a low state to p-type FET 420, which turns on. It is noted that, when used in conjunction with timer 410, p-type FET 420 and n-type FET 430 have over-lapping "off" times, non-overlapping "on" times, and operate substantially out of phase with each other.

Figure 6:
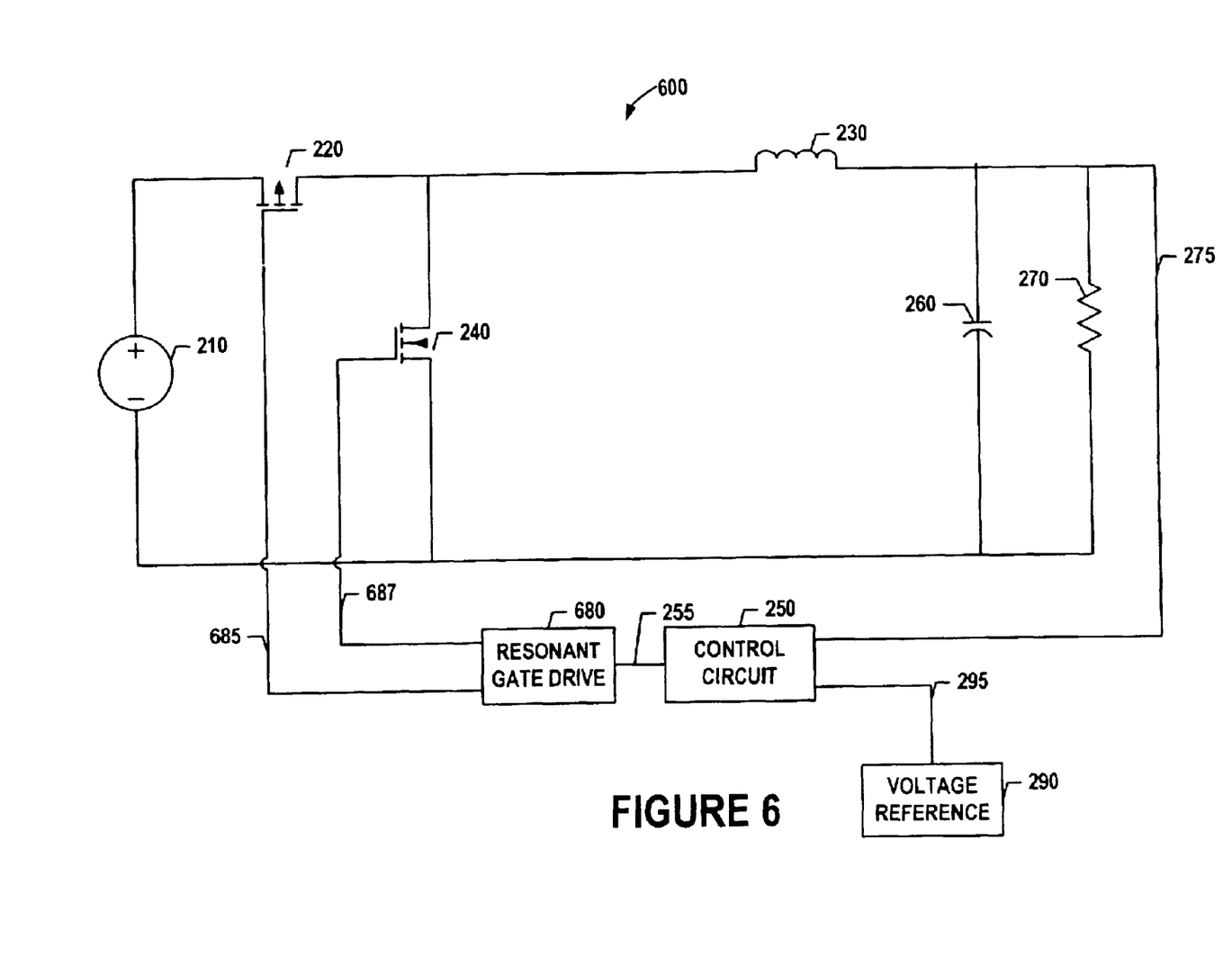
FIG. 6 is a schematic diagram illustrating an alternative embodiment of a buck converter.

FIG. 6 illustrates an alternative embodiment of a buck converter 600 in accordance with the invention. Buck converter 600 is similar to buck converter 200 in a number of respects. In this regard, similar elements of buck converter 600 and buck converter 200 are indicated with the same reference numerals. It will be appreciated that the invention is not so limited, and alternatives for these elements of buck converters 200 and 600 exist.

Buck converter 600 differs from buck converter 200 in at least the following respects. Resonant gate-drive circuit 680 includes two output terminals (which are coupled with signal lines 685 and 687). This allows for individual control of the FETs included in the series synchronous rectifier (e.g. p-type FET 220 and n-type FET 240). Such a configuration may further reduce switching losses for buck converter 600 as opposed to other approaches. In this respect, such a configuration may reduce shoot-through current in the series synchronous rectifier as a result of resonant gate-drive circuit 680 individually controlling the FETs.

Figure 7:
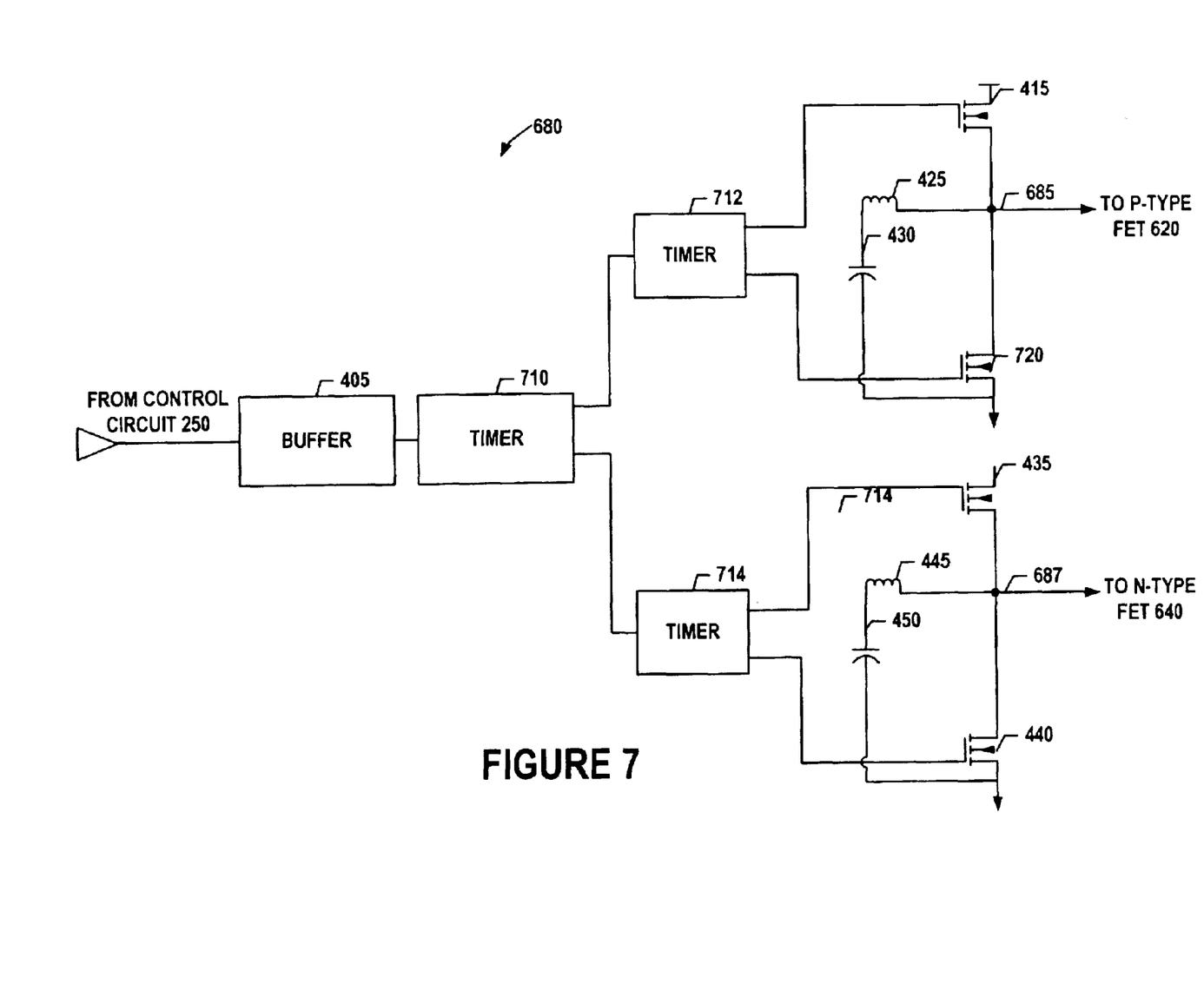
FIG. 7 is a schematic diagram illustrating an alternative embodiment of a resonant gate-drive circuit.
Figure 8:
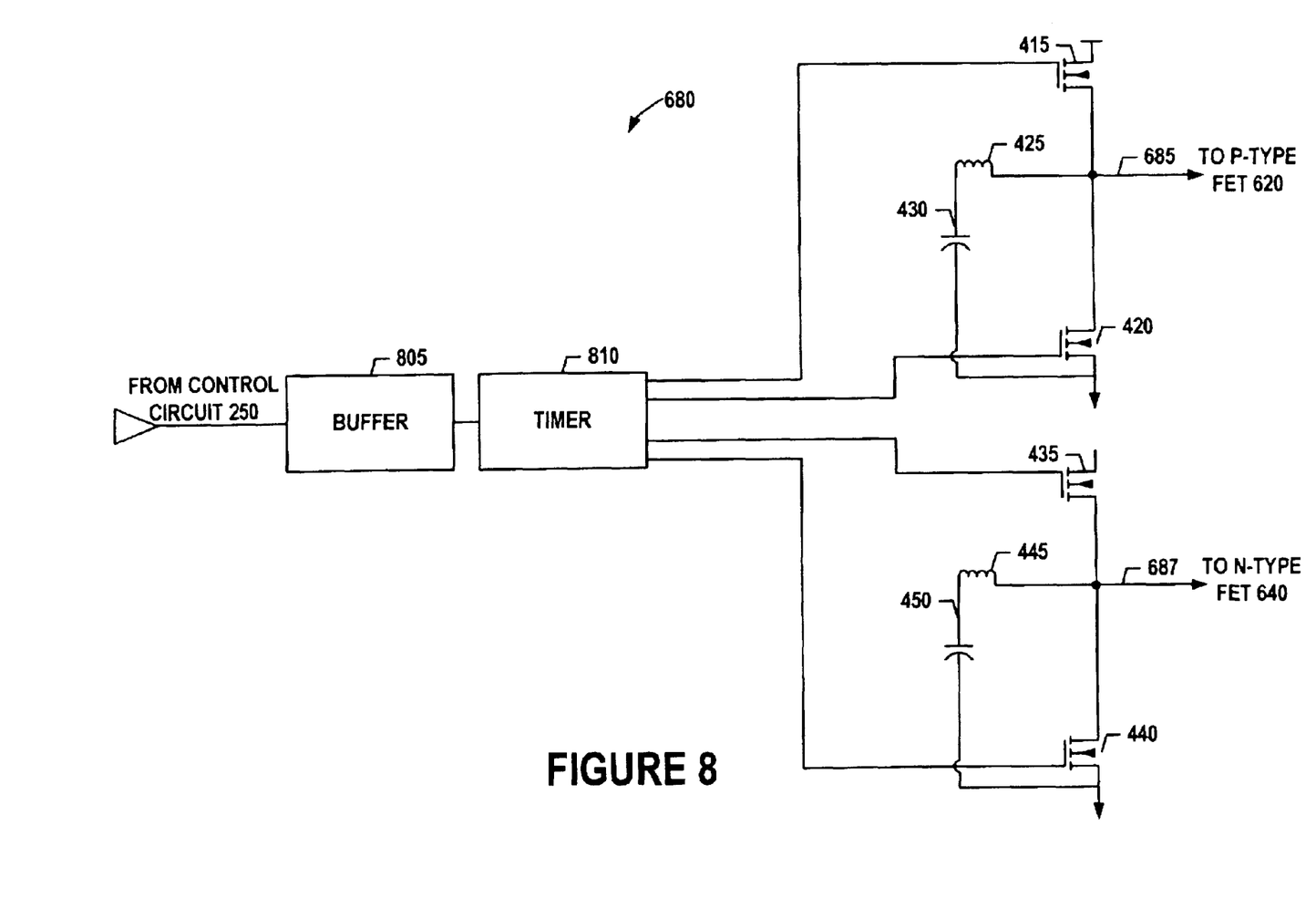
FIG. 8 is a schematic diagram illustrating another alternative embodiment of a resonant gate-drive circuit.

FIGS. 7 and 8 illustrate two alternative embodiments of a resonant gate-drive circuit, respectively 680 and 680', that may be used with buck converter 600, as shown in FIG. 6. These circuits are similar in certain respects to the gate-drive circuit shown in 4 and like reference numbers have been used in such cases. Again, it will be appreciated that alternatives exist and the invention is not limited to the particular exemplary embodiments described herein.

Resonant gate-drive circuit 680 differs from circuit 280 shown in FIG. 4 in that it includes multiple cascaded timers 710, 712 and 714 forming a first and second timing path. Individual timers 710, 712 and 714 may be of similar configuration as timer 410 shown in FIG. 5, or may have completely different configurations, depending on the particular embodiment. The additional timer path shown in FIG. 7 may be used to control a second inverter circuit (p-type FET 435 and n-type FET 440) that includes a corresponding inductive-capacitive resonant circuit (inductor 445 and capacitor 450). In this respect, an output terminal of the first inverter circuit is coupled with the gate of p-type FET 220 via signal line 685 and an output terminal of the second inverter is coupled with the gate of n-type FET 240 via signal line 687.

FIG. 8 is a schematic diagram that illustrates another alternative resonant gate-drive circuit 680' that may be used with buck converter 600 shown in FIG. 6. Resonant gate-drive circuit is similar in a number of respects to resonant gate-drive circuit 680 shown in FIG. 7 and those aspects are indicated with like reference numerals. Resonant gate-drive circuit 680' varies from the circuit shown in FIG. 7 in that resonant gate-drive circuit 680' includes only a single timer 810 with four output terminals that control the p-type and n-type FETs included in the two inverter circuits. Timer 810 may include multiple circuit paths, as was discussed with respect to timer 410 shown in FIG. 4. Such circuit paths may be configured in a similar fashion as with timer 410, though the invention is not so limited.

Figure 9:
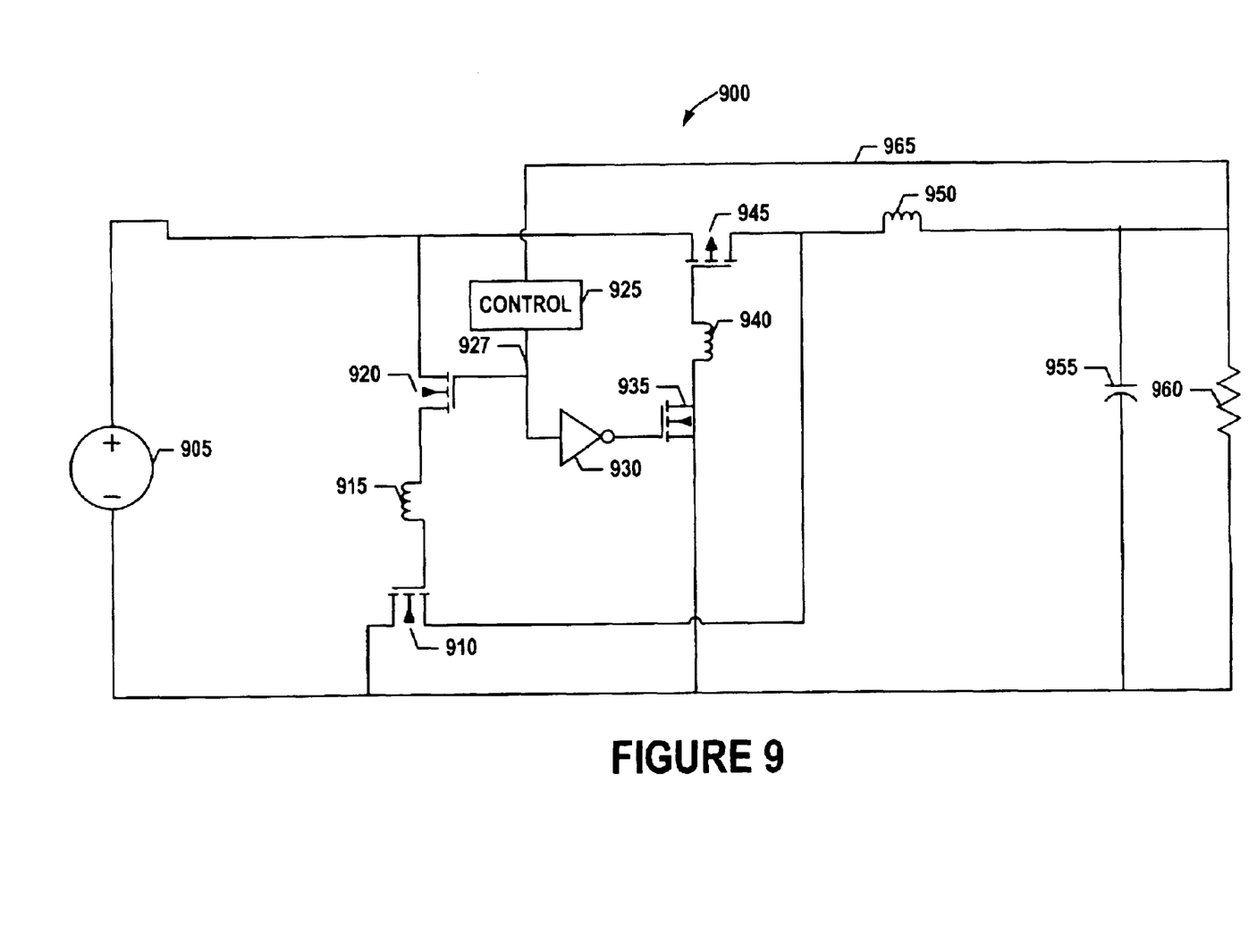
FIG. 9 is schematic diagram illustrating another alternative embodiment of a buck converter.

FIG. 9 is a schematic diagram that illustrates yet another alternative embodiment of a buck converter 900 in accordance with the invention. Buck converter 900 comprises a static direct current voltage source 905, which provides an input voltage for buck converter 900. Buck converter 900 also comprises an output voltage filter that includes an inductor 950 and a capacitor 955, which store electrical energy and reduce variation of the regulated, stepped-down output voltage produced by buck converter 900.

Voltage source 905 is coupled, in series, with two switching devices, which, for this embodiment, take the form of n-type field effect transistor (FET) 910 and p-type FET 945. In this configuration, n-type FET 910 and p-type FET 945 may function as a series synchronous rectifier. In this respect, when p-type FET 945 is on and n-type FET 910 is off, electrical energy from voltage source 905 may be supplied to inductor 950 and capacitor 955. Conversely, when n-type FET 110 is on and p-type FET 945 is off, electrical energy from inductor 950 and capacitor 955 may be diverted to ground. Control circuit 925, in combination with resonant gate-drive circuits, as will be described in further detail below, would determine, at least in part, the timing of opening and closing n-type FET 910 and p-type FET 945. Such timing control regulates the voltage potential across capacitor 955, which may be supplied to a load impedance 960. It will be appreciated that load impedance 960, as has been previously described with respect to FIGS. 2 and 6, may vary over time, and the output voltage of buck converter 900 may be regulated in response to that variation.

For buck converter 900, n-type FET 910 and p-type FET 945 would operate out of phase with each other. That is, n-type FET 910 will be open (not conducting current) when p-type FET 945 is closed (conducting current), and vice-versa. Opening and closing of n-type FET 910 and p-type FET 945 is accomplished, at least in part, using respective resonant circuits, as was indicated above. For n-type FET 910, the resonant gate-drive circuit comprises inductor 915 and the capacitance of the gate of n-type FET 910, forming an inductive-capacitive resonant circuit. Likewise, the resonant gate-drive circuit for p-type FET 945 comprises inductor 940 and the capacitance of the gate of p-type FET 945.

Buck converter 900 further comprises a control circuit 925, an inverter 930 and n-type FETs 920 and 935. Control circuit 925 senses an output voltage of buck converter 900 via feedback signal line 965. Based on that output voltage, control circuit 925 activates one of the two resonant gate-drive circuits. This is done via a single control signal line 927, which is coupled with a gate of n-type FET 920 and further coupled with a gate of n-type FET 935 via inverter 930. The sensed voltage may be compared with a reference voltage (e.g. the desired output voltage) by control circuit 925. If the sensed voltage is above the reference voltage, n-type FET 910 may be turned on and p-type FET 945 may be turned off to divert current from inductor 950 to electrical ground. Conversely, if the sensed voltage is below the reference voltage, p-type FET 945 may be turned on and n-type FET 910 may be turned off, so as to supply electrical energy from voltage source 905 to inductor 950 and capacitor 955.

This configuration provides for out of phase operation of the two resonant gate-drive circuits and their associated FETs. Such a configuration may reduce the power consumption of a buck converter as a result of a reduction in power consumption due to switching the series synchronous rectifier switching devices, n-type FET 910 and p-type FET 945 for buck converter 900.

Regulation of voltage conversion using buck converter 900 depends, at least in part, on the desired switching frequency of such a converter. In this regard, switching in such a buck converter would be done at approximately zero current crossings of the resonant gate-drive circuits. Such an approach may reduce the occurrence of current spikes from inductors 915 and 940, which may damage the gates of n-type FETs 920 and 935 if switching is not done in this manner. In this regard, the values for inductors 915 and 940 depend, at least in part, on a desired switching frequency for a particular embodiment of buck converter 900. While the invention is not limited to any particular embodiment, the following table illustrates inductor values for inductors 915 and 940 for embodiments of buck converter 900 with a one hundred megahertz switching frequency at various control signal duty cycles (produced by control 925) and various resonant frequencies for the gate-drive circuits.

| Duty Cycle of control signal from 925 | Switching Frequency (MHz) | Resonant frequency for n-type FET 910 drive circuit (MHz) | Resonant frequency for p-type FET 945 drive circuit (MHz) | Inductor 915 (nH) | Inductor 940 (nH) |
|---|---|---|---|---|---|
| 0.1 | 100 | 1000 | 111 | 0.0843 | 6.8 |
| 0.2 | 100 | 500 | 125 | 0.03 | 5.39 |
| 0.3 | 100 | 333 | 142 | 0.759 | 4.13 |
| 0.4 | 100 | 167 | 250 | 1.34 | 3.03 |
| 0.5 | 100 | 200 | 200 | 2.1 | 2.1 |
| 0.6 | 100 | 250 | 167 | 3.03 | 1.34 |
| 0.7 | 100 | 142 | 333 | 4.13 | 0.759 |
| 0.8 | 100 | 125 | 500 | 5.39 | 0.03 |
| 0.9 | 100 | 111 | 1000 | 6.8 | 0.0843 |

Figure 10:
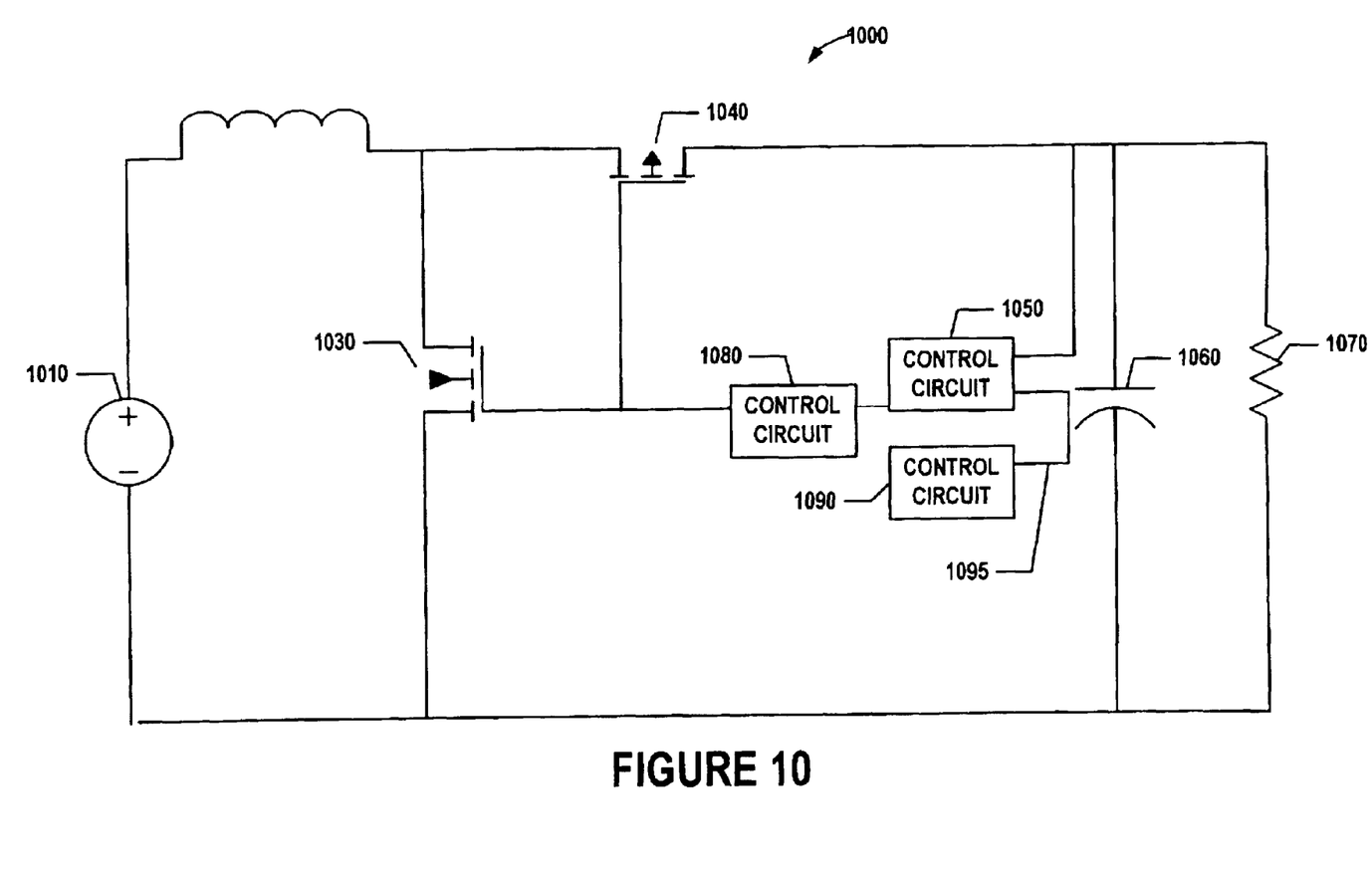
FIG. 10 is a schematic diagram illustrating another embodiment of a direct current voltage step-up converter.

FIG. 10 is a schematic diagram illustrating an embodiment of a direct current voltage step-up (boost) converter 1000 in accordance with the invention. Boost converter 1000 includes a direct current voltage input supply 1010, which is coupled with an inductor 1020. Inductor 1020 stores electrical energy from supply 1010 that is used by converter 1000 to boost that voltage. Converter 1000 also includes n-type FET 1030 and p-type FET 1040, which act, respectively as a step up switch and a synchronous switch for converter 1000. Voltage converted by converter 1000 may be stored and filtered by a capacitor 1060 and supplied to a load resistance 1070, which may be a time varying impedance, as has been previously described with respect to FIG. 2.

Boost converter 1000 also includes a control circuit 1050 and a voltage reference 1090. Control circuit 1050 may compare an output voltage of converter 1000 with a reference voltage generated by voltage reference 1090 using signal lines 1075 and 1095. A signal based on that comparison may then be sent to a resonant gate-drive circuit 1080. Resonant gate-drive circuit 1080 may be of a similar configuration as resonant gate drive 280, shown in FIG. 4, though the invention is not so limited. For this embodiment, resonant gate drive 1080 would switch n-type FET 1030 and p-type FET 1040 in a similar fashion as was discussed with respect to buck converter 200 and FIGS. 2 and 4. Additionally, resonant gate-drive circuit 1080 may be replaced with a resonant gate-drive circuit such as resonant gate-drive circuits 680 and 680', shown respectively in FIG. 7 and FIG. 8.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A direct current to direct current voltage buck converter circuit comprising:
    a substantially static direct current voltage power supply;
    a series synchronous rectifier coupled with the power supply;
    an inductive-capacitive output voltage filter coupled with the series synchronous rectifier;
    a control circuit coupled with an output terminal of the buck converter;
    a voltage reference source coupled with the control circuit, wherein the control circuit compares a reference voltage generated by the voltage reference source with an output voltage generated by the buck converter, and produces a comparison signal based on that comparison; and
    a resonant gate-drive circuit coupled with the control circuit and the series synchronous rectifier, wherein the resonant gate-drive circuit controls the series synchronous rectifier based, at least in part, on the signal produced by the control circuit;
    wherein the resonant gate-drive circuit comprises:
        an inverter circuit; the inverter circuit having an input terminal coupled with the control circuit and an output terminal coupled with the series synchronous rectifier;
        an inductive-capacitive resonant circuit coupled with, and between, an electrical ground and the output terminal of the inverter circuit, wherein the resonant gate-drive circuit operates the series synchronous rectifier so as to regulate the output voltage generated by the buck converter such that the output voltage approximates the reference voltage generated by the voltage reference source;
        a buffer circuit for receiving and amplifying the signal produced by the control circuit; and
        a timer circuit coupled with the buffer circuit and the inverter circuit so as to control a pull-up device and pull-down device of the inverter, such that, in operation, the pull-up device and the pull-down device are not in a conduction state simultaneously, wherein the inverter circuit is coupled with the control circuit via the buffer circuit and the timer circuit.

2. The buck converter of claim 1, wherein the buck converter is a monolithic buck converter implemented on a single integrated circuit.

3. The buck converter of claim 1, wherein the series synchronous rectifier comprises a p-type field effect transistor (FET) having a source terminal coupled with a positive terminal of the power supply, a drain terminal coupled with the voltage filter and a gate terminal coupled with the resonant gate-drive circuit; and
    a n-type FET having a drain terminal coupled with the drain terminal of the p-type FET, a source terminal coupled with an electrical ground, and a gate terminal coupled with the resonant gate-drive circuit.

4. The buck converter of claim 1, wherein the control circuit comprises a voltage amplifier that compares the voltage reference with the output voltage of the buck converter to produce an indication signal that indicates whether the output voltage of the buck converter is above or below the reference voltage; and
    a PWM circuit coupled with the voltage amplifier so as to be responsive to the indication signal, the PWM circuit, in turn, producing the comparison signal, which is then communicated to the resonant gate-drive circuit and, at least in part, directs operation of the resonant gate-drive circuit.

5. The buck converter of claim 1, wherein the timer circuit comprises multiple circuit paths each including one or more delay elements, such that a signal communicated to an input terminal of the timer reaches the end of each of the multiple circuit paths at different times.

6. The buck converter of claim 5, wherein at least one circuit path has a first delay for a low to high transition and a second delay for a high to low transition, wherein the second delay is longer than the first delay.

7. A direct current to direct current voltage buck converter circuit comprising:
    a substantially static direct current voltage power supply;
    a series synchronous rectifier coupled with the power supply;
    an inductive-capacitive output voltage filter coupled with the series synchronous rectifier;
    a control circuit coupled with an output terminal of the buck converter;
    a voltage reference source coupled with the control circuit, wherein the control circuit compares a reference voltage generated by the voltage reference source with an output voltage generated by the buck converter, and produces a comparison signal based on that comparison; and
    a resonant gate-drive circuit coupled with the control circuit and the series synchronous rectifier, wherein the resonant gate-drive circuit controls the series synchronous rectifier based, at least in part, on the signal produced by the control circuit;
    wherein the resonant gate-drive circuit comprises:
        a buffer circuit for receiving and amplifying the signal produced by the control circuit;
        plural timer circuits coupled with the buffer circuit;
        first and second inverter circuits each having;

an input terminal coupled with a respective timer circuit so as to control a pull-up device and pull-down device of each inverter circuit such that, in operation, the respective pull-up device and pull-down devices are not in a conduction state simultaneously; and an output terminal coupled with the series synchronous rectifier; and respective inductive-capacitive resonant circuits each coupled with, and between, an electrical ground and respective output terminals of the inverter circuits, wherein respective output terminals of the inverter circuits are coupled with the series synchronous rectifier so as to regulate the output voltage generated by the buck converter such that the output voltage approximates the reference voltage generated by the voltage reference source.

8. A direct current to direct current voltage buck converter circuit comprising:

a substantially static direct current voltage power supply;

a series synchronous rectifier coupled with the power supply;

an inductive-capacitive output voltage filter coupled with the series synchronous rectifier;

a control circuit coupled with an output terminal of the buck converter;

a voltage reference source coupled with the control circuit, wherein the control circuit compares a reference voltage generated by the voltage reference source with an output voltage generated by the buck converter, and produces a comparison signal based on that comparison; and a resonant gate-drive circuit coupled with the control circuit and the series synchronous rectifier, wherein the resonant gate-drive circuit controls the series synchronous rectifier based, at least in part, on the signal produced by the control circuit;

wherein the resonant gate-drive circuit comprises:

a buffer circuit for receiving and amplifying the signal produced by the control circuit;

a timer circuit coupled with the buffer circuit;

first and second inverter circuits each having an input terminal coupled with the timer circuit and an output terminal coupled with the series synchronous rectifier, each being coupled with the timer circuit so as to control a pull-up device and pull-down device of each inverter circuit such that, in operation, the respective pull-up device and pull-down devices are not in a conduction state simultaneously; and respective inductive-capacitive resonant circuits each coupled with, and between, an electrical ground and the output terminal of the inverter circuits;

wherein respective output terminals of the inverter circuits are coupled with the series synchronous rectifier so as to regulate the output voltage generated by the buck converter such that the output voltage approximates the reference voltage generated by the voltage reference source.

9. A direct current to direct current voltage buck converter comprising:

an inductive-capacitive output voltage filter;

a series synchronous rectifier coupled with the output voltage filter, wherein the rectifier comprises a first switching device and a second switching device, which, in operation, are opened and closed by a resonant gate-drive circuit having respective first and second inductive-capacitive drive circuits, such that the first and second switching devices operate substantially out of phase with respect to each other; and a control circuit coupled with the output voltage filter, a third switching element and a fourth switching element, wherein the third and fourth switching elements are coupled with, respectively, the first and second drive circuits, such that closing the third and fourth switching elements activates its respective drive circuit.

10. The buck converter of claim 9, wherein the buck converter is a monolithic buck converter implemented on a single integrated circuit.

11. The buck converter of claim 10, wherein the first and second switching devices comprise field effect transistors, and the capacitive element of the first and second drive circuits comprise respective gate capacitances of the first and second switching devices.

12. The buck converter of claim 9, wherein the first switching device comprises a p-type field effect transistor, which is coupled with the voltage source and the output voltage filter; and the second switching device comprises an n-type field effect transistor, which is coupled with the first switching device, the output voltage filter and an electrical ground.

13. The buck converter of claim 9, wherein the control circuit opens and closes the third and fourth switching elements based, at least in part, on an output voltage potential present on the output voltage filter, and respective resonant frequencies of the first and second drive circuits.

* * * * *